(12) United States Patent
Christiansen et al.

(10) Patent No.: US 12,487,603 B2
(45) Date of Patent: Dec. 2, 2025

(54) SYSTEM AND METHOD OF ASSISTED OR AUTOMATED CROP TRANSFER SYNCHRONIZATION

(71) Applicant: AGCO International GmbH, Neuhausen (CH)

(72) Inventors: Martin Peter Christiansen, Randers (DK); Ramon Buchaca Tarragona, Randers (DK); Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 251 days.

(21) Appl. No.: 18/181,811

(22) Filed: Mar. 10, 2023

(65) Prior Publication Data

US 2023/0324927 A1 Oct. 12, 2023

(30) Foreign Application Priority Data

Apr. 7, 2022 (GB) ...................................... 2205131

(51) Int. Cl.
    *G05D 1/00* (2024.01)
    *A01D 90/10* (2006.01)
(52) U.S. Cl.
    CPC ........... *G05D 1/0287* (2013.01); *A01D 90/10* (2013.01); *G05D 1/0238* (2013.01); *G05D 1/0257* (2013.01)
(58) Field of Classification Search
    CPC ................................ A01D 90/10; A01D 43/07
    See application file for complete search history.

(56) References Cited

U.S. PATENT DOCUMENTS

| | | | |
|---|---|---|---|
| 2020/0133262 A1* | 4/2020 | Suleman | G05D 1/0278 |
| 2020/0319655 A1 | 10/2020 | Desai et al. | |
| 2021/0195840 A1* | 7/2021 | Puryk | A01D 90/10 |
| 2022/0018955 A1 | 1/2022 | Christiansen et al. | |

OTHER PUBLICATIONS

Zhou, J., Jin, W., Wang, M., Liu, X., Li, Z., & Liu, Z. (2021). Improvement of Normal Estimation for PointClouds via Simplifying Surface Fitting. arXiv [Cs.CV]. (Year: 2021).*
A. Chávez-Aragón, R. Laganière and P. Payeur, "Vision-based detection and labelling of multiple vehicle parts," 2011 14th International IEEE Conference on Intelligent Transportation Systems (ITSC), Washington, DC, USA, 2011, pp. 1273-1278. (Year: 2011).*
UK Intellectual Property Office, Search report for related UK Application No. GB2205131.2, dated Oct. 10, 2022, 5 pages.

* cited by examiner

*Primary Examiner* — Hitesh Patel
*Assistant Examiner* — Tabitha Kress

(57) ABSTRACT

A system includes an agricultural crop receiving vehicle with a bin for receiving and holding agricultural crop material and an electromagnetic detecting and ranging module for generating data indicating the presence and location of a harvester proximate the agricultural crop receiving vehicle. One or more one or more computing devices are configured to receive the data from the electromagnetic detecting and ranging module, determine a location of the harvester relative to the agricultural crop receiving vehicle, and use the location information to generate control signals for controlling movement of the agricultural crop receiving vehicle to coordinate receiving crop material in the bin from the harvester or for controlling a graphical user interface to present a visual indicator of the relative locations of the agricultural crop receiving vehicle and the harvester.

18 Claims, 11 Drawing Sheets

SYSTEM AND METHOD OF ASSISTED OR AUTOMATED CROP TRANSFER SYNCHRONIZATION

FIELD

Embodiments of the present invention relate to systems and methods for assisted or automated synchronization of agricultural machine operations. More particularly, embodiments of the present invention relate to systems and methods for assisted or automated synchronization of machine movement during transfer of crop material from one machine to another.

BACKGROUND

Combine harvesters are used in agricultural production to cut or pick up crops such as wheat, corn, beans and milo from a field and process the crop to remove grain from stalks, leaves and other material other than grain (MOG). Processing the crop involves gathering the crop into a crop processor, threshing the crop to loosen the grain from the MOG, separating the grain from the MOG and cleaning the grain. The combine harvester stores the clean grain in a clean grain tank and discharges the MOG from the harvester onto the field. The cleaned grain remains in the clean grain tank until it is transferred out of the tank through an unload conveyor into a receiving vehicle, such as a grain truck or a grain wagon pulled by a tractor.

To avoid frequent stops during a harvesting operation it is common to unload the grain from a harvester while the combine harvester is in motion harvesting crop. Unloading the harvester while it is in motion requires a receiving vehicle to drive alongside the combine harvester during the unload operation. This requires the operator driving the receiving vehicle to align a grain bin of the receiving vehicle with the spout of an unload conveyor of the combine for the duration of the unload operation. Aligning the two vehicles in this manner is laborious for the operator of the receiving vehicle and, in some situations, can be particularly challenging. Some circumstances may limit the operator's visibility, for example, such as where there is excessive dust in the air around the receiving vehicle or at nighttime. Furthermore, if the receiving vehicle has a large or elongated grain bin, such as a large grain cart or a grain truck, it is desirable to shift the position of the grain bin relative to the spout during the unload operation to evenly fill the grain bin and avoid spilling grain. The operator of the receiving vehicle cannot see into the bin of the receiving vehicle from the operator's cabin and, therefore, must estimate the fill pattern of the receiving vehicle during the fill process and shift the position of the grain bin accordingly to try to fill the receiving vehicle evenly.

Forage harvesters also process crop but function differently from combine harvesters. Rather than separating grain from MOG, forage harvesters chop the entire plant—including grain and MOG—into small pieces for storage and feeding to livestock. Forage harvesters do not store the processed crop onboard the harvester during the harvest operation, but rather transfer the processed crop to a receiving vehicle by blowing the crop material through a discharge chute to the receiving vehicle, such as a silage wagon pulled by a tractor, without storing it on the harvester. Thus, a receiving vehicle must closely follow the forage harvester during the entire harvester operation. This presents similar challenges to those discussed above in relation to the combine harvester.

Other types of harvesters, such as some vegetable harvesters including potato harvesters, function similarly to forage harvesters in that they transfer harvested crop to a receiving vehicle without storing the crop on the harvester.

The above section provides background information related to the present disclosure which is not necessarily prior art.

SUMMARY

A system according to an embodiment of the invention comprises an agricultural crop receiving vehicle including a bin for receiving and holding agricultural crop material and an electromagnetic detecting and ranging module for generating data indicating the presence and location of a harvester proximate the agricultural crop receiving vehicle. The system further comprises one or more computing devices for receiving the data from the electromagnetic detecting and ranging module, determining location information using the data, the location information including a location of the harvester relative to the agricultural crop receiving vehicle, and using the location information to generate control signals for controlling movement of the agricultural crop receiving vehicle to coordinate receiving crop material in the bin from the harvester or for controlling a graphical user interface to present a visual indicator of the relative locations of the agricultural crop receiving vehicle and the harvester.

In some embodiments, the data generated by the electromagnetic detecting and ranging module indicates a lateral distance of the harvester from the agricultural crop receiving vehicle and a longitudinal position of the harvester relative to the agricultural crop receiving vehicle.

In some embodiments, the one or more computing devices are configured to use the data to determine a location of the harvester relative to the agricultural crop receiving vehicle by identifying a pattern of data points in the data corresponding to a surface or an edge of the harvester and determining the location of the surface or edge using the locations of the data points forming the pattern.

In some embodiments, the electromagnetic detecting and ranging module performs a two-dimensional scan, in other embodiments it performs a three-dimensional scan; in some embodiments it includes a light detecting and ranging (LiDAR) module, in other embodiments it includes a radio detecting and ranging (RADAR) module.

In some embodiments, the data collected by the electromagnetic detecting and ranging module indicates the location of the harvester proximate the agricultural crop receiving vehicle and a fill level or distribution of crop material in the bin of the agricultural crop receiving vehicle, and the one or more computing devices are configured to use the location information and the data from the one or more sensors for controlling movement of the agricultural crop receiving vehicle to coordinate receiving crop material in the bin from the harvester according to a predetermined fill level or distribution pattern, or for controlling the graphical user interface to present a visual indicator of the relative locations of the agricultural crop receiving vehicle and of a fill level or a distribution of crop in the bin. Furthermore, in some embodiments the electromagnetic detecting and ranging module performs a three-dimensional scan and is positioned above the bin of the agricultural crop receiving vehicle such that a field of view of the module includes the inside of the bin and an area outside the bin proximate the agricultural crop receiving vehicle.

A method according to an embodiment of the invention comprises receiving, using one or more computing devices, data generated by an electromagnetic detecting and ranging module, the electromagnetic detecting and ranging module being on an agricultural crop receiving vehicle and the data indicating the presence and location of a harvester proximate the agricultural crop receiving vehicle; determining, using the one or more computing devices, location information using the data, the location information including a location of the harvester relative to the agricultural crop receiving vehicle; and using the one or more computing devices to generate control signals using the location information, the control signals for controlling movement of the agricultural crop receiving vehicle to coordinate receiving crop material in a bin of the receiving vehicle from the harvester or for controlling a graphical user interface to present a visual indicator of the relative locations of the agricultural crop receiving vehicle and the harvester.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF DRAWINGS

Embodiments of the present invention are described in detail below with reference to the attached drawing figures, wherein.

Figure 1:
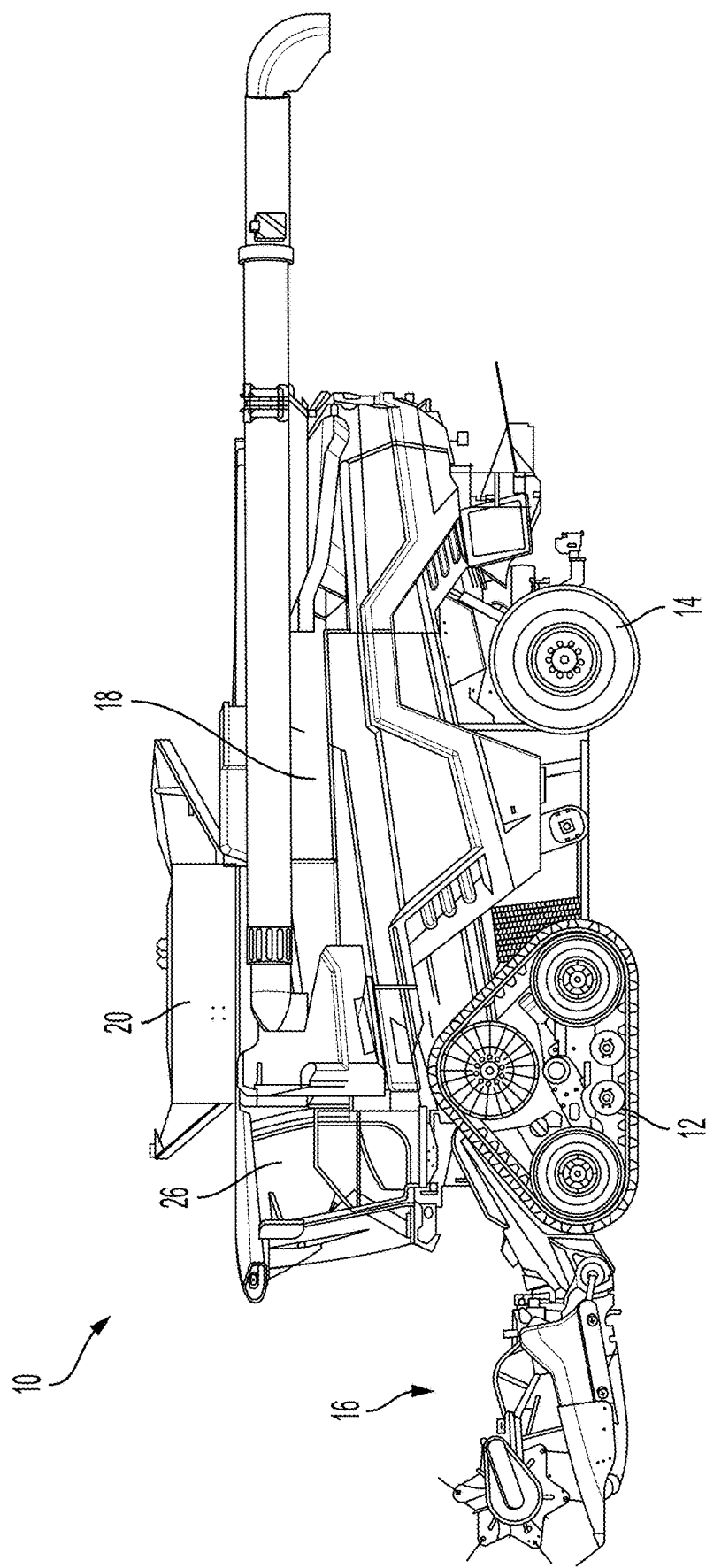
FIG. 1 is a side elevation view of an agricultural harvester.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Given the challenges of synchronizing the operation of agricultural harvesters and agricultural crop receiving vehicles during crop transfer operations, as explained above, it is desirable to automatically control operation of the receiving vehicle to maintain the desired relative positions of the two machines or to assist machine operators in manually controlling one or more of the machines to maintain the desired relative positions of the two machines. One method of controlling or assisting operation of at least one of the machines in this way involves placing an electromagnetic detecting ranging module on the receive vehicle in a position to capture data from an area proximate the receiving vehicle where the harvester is located during a crop transfer operation. One or more computing devices identify the presence of the harvester from data captured by the electromagnetic detecting ranging module by identifying one or more features of the harvester in the data. The one or more computing devices determine the location of the harvester relative to the receiving vehicle using the features of the harvester identified in the data. The one or more computing devices use the location information to generate control signals for controlling movement of the agricultural crop receiving vehicle to coordinate receiving crop material from the harvester or for controlling a graphical user interface to present a visual indicator of the relative locations of the agricultural crop receiving vehicle and the agricultural harvester.

A system according to an embodiment of the invention comprises an agricultural crop receiving vehicle including a bin for receiving and holding agricultural crop material and an electromagnetic detecting and ranging module for generating data indicating the presence and location of a harvester proximate the agricultural crop receiving vehicle. The system further includes one or more computing devices for receiving the data from the electromagnetic detecting and ranging module, determining location information using the data, the location information including a location of the harvester relative to the agricultural crop receiving vehicle, and using the location information to generate control signals for controlling movement of the agricultural crop receiving vehicle to coordinate receiving crop material in the bin from the harvester or for controlling a graphical user interface to present a visual indicator of the relative locations of the agricultural crop receiving vehicle and the harvester.

Figure 2:
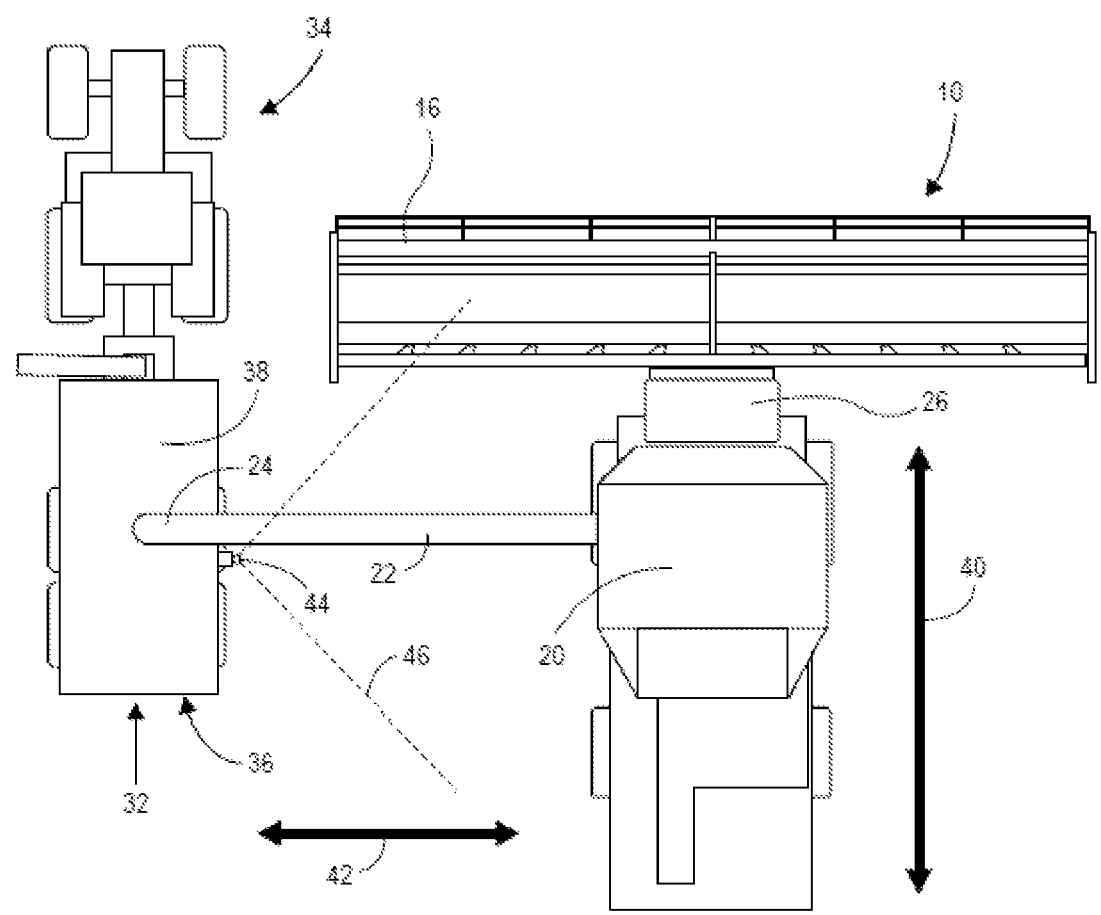
FIG. 2 illustrates the agricultural harvester of FIG. 1 and an agricultural crop receiving vehicle, with the agricultural harvester in position to transfer processed crop material to the receiving vehicle.

Turning now to the drawing figures, and initially FIGS. 1 and 2, an agricultural harvester 10 and a receiving vehicle 32 are illustrated. The harvester 10 is a combine harvester that cuts or picks up crop from a field, threshes the crop to loosen the grain from material other than grain (MOG), separates the grain from the MOG, cleans the grain, stores the clean grain in a clean grain tank and transfers the clean grain out of the clean grain tank to a receiving vehicle or other receptacle. The illustrated harvester 10 includes a pair of front tracks 12 and a pair of rear wheels 14 that support the harvester 10 on a ground surface, propel it along the ground surface and provide steering. A header 16 cuts crop standing in a field (or picks up crop that was previous cut) as the harvester 10 moves through the field and gathers the cut crop to be fed to a processor housed within a body 18 of the harvester 10.

The processor threshes the grain, separates the grain from the MOG, cleans the grain and stores the grain in a clean grain tank 20. Thus, the processor reduces crop material (plants or portions of plants cut or picked up from the field) to processed crop (grain). An unload conveyor 22 transfers grain from the clean grain tank 20 to a receiving vehicle or other receptacle using one or more augers, belts or similar mechanisms to move grain out of the clean grain tank 20, through the unload conveyor 22 and out a spout 24 positioned at an end of the unload conveyor 22 distal the body 18 of the harvester 10. The unload conveyor 22 is illustrated in a stowed position in FIG. 1 used when the harvester 10 is not transferring grain out of the grain tank 20. The unload conveyor 22 is moveable between the stowed position and a deployed position, illustrated in FIG. 2, used to transfer grain from the grain tank 20 to a receiving vehicle or other receptacle. The receiving vehicle 32 illustrated in FIG. 2 is a tractor 34 and grain cart 36 combination. The grain cart 36 includes a grain bin 38 for holding crop transferred out of the harvester 10. When the unload conveyor 22 is in the deployed position it is generally perpendicular to a longitudinal axis of the harvester 10, the longitudinal axis being parallel with line 40 in FIG. 2. When the unload conveyor 22 is in the fully stowed position (FIG. 1) it is generally parallel with the longitudinal axis of the harvester. When in the deployed position the unload conveyor 22 is generally parallel with lateral axis of the harvester 10, the lateral axis being parallel with line 42 in FIG. 2.

An operator cabin 26 includes a seat and a user interface for enabling an operator to control various aspects of the harvester 10. The user interface includes mechanical components, electronic components, or both such as, for example, joysticks, buttons, knobs, switches, levers and dials as well as electronic touchscreen displays that both present information to the operator in graphical form and receive information from the operator.

The receiving vehicle 32 includes an electromagnetic detecting and ranging module 44 for generating data indicating the presence and location of a harvester proximate the receiving vehicle 32, as explained below. In the embodiment illustrated in FIG. 2, the electromagnetic detecting and ranging module 44 is mounted on an exterior side surface of the grain cart 36 at or near a middle of the cart 36 (front to back), facing the harvester 10 and is located between one meter and four meters from the ground. It will be appreciated that the precise location of the electromagnetic detecting and ranging module 44 on the receiving vehicle 32 is not critical and that the module 44 may be placed in other, equally-preferred locations. By way of example, the module 44 may be mounted forwardly or rearwardly of the illustrated position on the grain cart 36 illustrated in FIG. 2 or may be mounted on the tractor 34.

Figure 3:
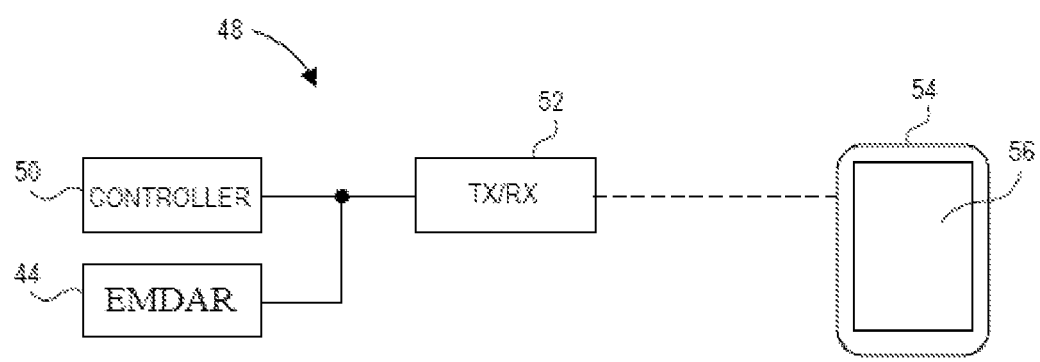
FIG. 3 is a block diagram of an unload synchronization assistance system for use with the agricultural crop receiving vehicle and/or the agricultural harvester of FIG. 2.

An unload synchronization assistance system 48 is illustrated in FIG. 3 and provides automated or assisted coordination or synchronization of movement or location between the receiving vehicle 32 and the harvester 10 during crop transfer operations, such as when the harvester 10 is unloading grain from the clean grain tank 20 as illustrated in FIG. 2. More particularly, the system 48 uses image data from the electromagnetic detecting and ranging module 44 to determine a location of the harvester 10 relative to the receiving vehicle 32 and generates control signals for controlling movement of the receiving vehicle 32 to coordinate receiving crop material in the bin 38 from the harvester 10. Alternatively or additionally, the system 48 may generate control signals for controlling a graphical user interface to present a visual indicator of the relative locations of the receiving vehicle 32 and the agricultural harvester 10. The graphical user interface may be part of a portable or handheld electronic device used by an operator of the receiving vehicle 32, by an operator of the harvester 10, or both. The operator of the receiving vehicle 32 may use the visual indicator, for example, to determine the relative positions of the receiving vehicle 32 and the harvester 10 and manually control movement of the receiving vehicle 32 accordingly. The operator of the harvester 10 may use the visual indicator, for example, to adjust the position of the unload conveyor 22 if the harvester 10 is equipped with such functionality.

The system 48 broadly includes a controller 50, the electromagnetic detecting and ranging module 44, a wireless transceiver 52 and a portable electronic device 54 including a graphical user interface 56. The controller 50 comprises one or more computing devices. Each of the one or more computing devices includes one or more integrated circuits programmed or configured to implement the functions described herein. By way of example the controller 50 may include one or more general purpose microprocessors or microcontrollers, programmable logic devices, application specific integrated circuits or other computing devices. The controller 50 may include multiple computing components, such as electronic control units, placed in various different locations on or in the receiving vehicle 32. The controller 50 may also include one or more discrete and/or analog circuit components operating in conjunction with the one or more integrated circuits or computing components. Furthermore, the controller 50 may include or have access to one or more memory elements operable to store executable instructions, data, or both.

The wireless transceiver 52 is configured to communicate with the portable electronic device 54 using wireless communications technology. The wireless transceiver 52 may be configured to communicate according to one or more wireless communications protocols or standards, such as one or more protocols based on the IEEE 802.11 family of standards ("Wi-Fi"), the Bluetooth wireless communications standard, and/or a 433 MHz wireless communications protocol. Alternatively or additionally, the wireless transceiver 52 may be configured to communicate according to one or more proprietary or non-standardized wireless communication technologies or protocols, such as proprietary wireless communications protocols using 2.4 GHz or 5 GHz radio signals. Although illustrated in the diagram of FIG. 3 as a separate component, the wireless transceiver 52 may be physically integrated into a computing device associated with the controller 50. Therefore, reference may be made herein to the controller 50 sending or receiving a wireless signal with the understanding that the controller 50 is using the wireless transceiver 52 to send or receive the signal, whether the controller 50 and the wireless transceiver 52 are part of the same physical component or separate components.

The portable electronic device 54 includes a graphical user interface 56 for presenting graphical representations of the relative locations of the agricultural harvester 10 and the receiving vehicle 32. In the illustrated embodiment the portable electronic device 54 is a tablet computer, but it will be appreciated by those skilled in the art that it could be a smartphone or similar device capable of communicating wirelessly with the transceiver 52 to receive a wireless signal including location information and crop information and generating the graphical representations on the user interface 56. The portable electronic device 54 is discussed in greater detail below.

It will be appreciated that, for simplicity, certain elements and components of the system 48 have been omitted from the present discussion and from the diagram illustrated in FIG. 3. A power source or power connector is also associated with the system 48, for example, but is conventional in nature and, therefore, is not described herein.

The electromagnetic detecting and ranging module 44 uses reflected electromagnet waves to generate a digital representation of objects within a field of view of the module 44. More particularly, the module includes an emitter for emitting electromagnetic waves and a sensor for detecting reflected waves. Data generated by the sensor includes such information as an angle and a distance for each data point that indicate a point in space where the wave encountered and reflected off of an external object in the module's field of view. Thus, the digital representations generated by the module include distances to and relative locations of objects and surfaces within the field of view. Technologies that may be used in the module include LiDAR and RADAR.

Light detecting and ranging (LiDAR) is a method for measuring distances (ranging) by illuminating the target with laser light and measuring the reflection with a sensor. Differences in laser return times and wavelengths can then be used to make digital three-dimensional or two-dimensional representations of the area scanned. LiDAR may use ultraviolet, visible, or near infrared light to image objects and can target a wide range of materials, including metallic and non-metallic objects.

Radio detecting and ranging (RADAR) is a detection system that uses radio waves to determine the range, angle, and/or velocity of objects. A RADAR system includes a transmitter producing electromagnetic waves in the radio or microwave domains, a transmitting antenna, a receiving antenna (often the same antenna is used for transmitting and receiving) and a receiver and processor to determine properties of the object(s) within the scan zone of the system. Radio waves (pulsed or continuous) from the transmitter reflect off the object and return to the receiver, giving information about the object's location, direction of travel and speed.

The electromagnetic detecting and ranging module 44 collects data that define a digital representation of the area within the field of view 46 of the module 44 and communicate that data to the controller 50. The data collected by the module 44 includes location information for each of a plurality of points making up a point cloud. The location information is relative to the module and may include a set of two-dimensional Cartesian coordinates, such as X and Y coordinates of the point relative to the module; a set of three-dimensional Cartesian coordinates such as X, Y and Z coordinates; a set of polar coordinates such as a radial coordinate (r) indicating a distance from the module and an angular coordinate ($\theta$) indicating an angle from a reference direction; a set of spherical coordinates such as a radial coordinate (r) indicating a distance of the point from the module 32, a polar angle coordinate ($\theta$) measured from a fixed zenith direction, and an azimuthal angle coordinate ($\varphi$) of its orthogonal projection on a reference plane that passes through the origin and is orthogonal to the zenith, measured from a fixed reference direction on that plane; or a set of cylindrical coordinates such as a distance (r) to the point from a reference axis (typically corresponding to a location of the module), a direction ($\varphi$) from the reference axis, and a distance (Z) from a reference plane that is perpendicular to the reference axis.

Figure 4:
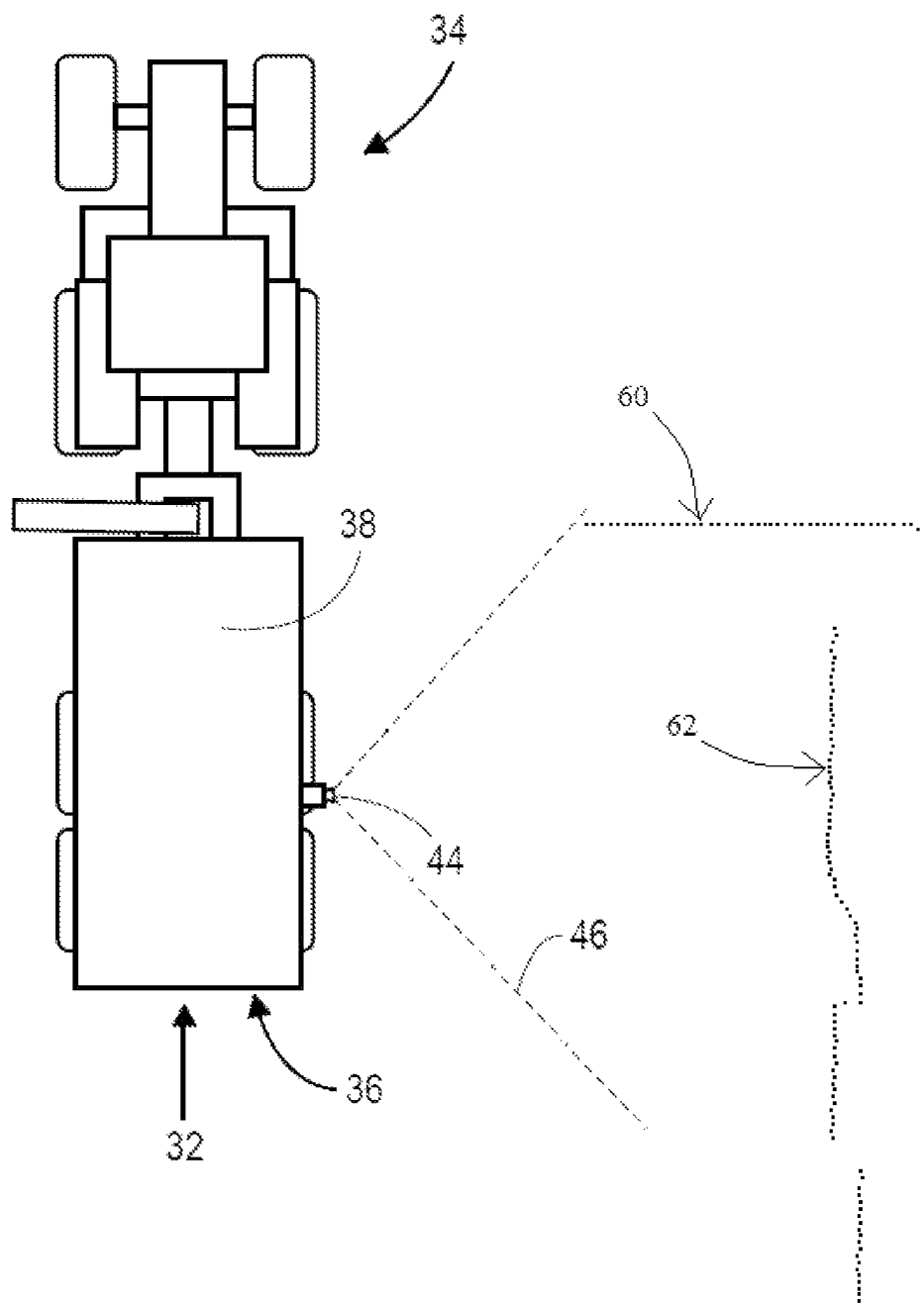
FIG. 4 illustrates data points captured by an electromagnetic detecting and ranging module on the agricultural crop receiving vehicle of FIG. 2.

In the embodiment illustrated in FIG. 2 the electromagnetic detecting and ranging module 44 is or includes two-dimensional LiDAR. Data collected by the module 44 is illustrated in FIG. 4 and includes data points corresponding to portions of the harvester 10 in the field of view 46, including a first data pattern 60 corresponding to the header 16 and a second data pattern 62 corresponding to a side of the body 18 of the harvester 10.

The controller 50 uses data collected by the electromagnetic detecting and ranging module 44 to determine location information, the location information including a location of the harvester 10 relative to the agricultural crop receiving vehicle 32. The controller 50 may detect patterns of data corresponding to surfaces or edges of the harvester 10. In the example illustrated in FIG. 4, the controller 50 may look for two orthogonal data patterns, such as patterns 60 and 62, that correspond to a portion of the header 16 and a portion of the body 18 of the harvester 10. Other data patterns may be used instead of, or in addition to, the patterns 60 and 62.

The data collected by the electromagnetic detecting and ranging module 44 includes distance associated with the various data points, as explained above. Therefore, the controller 50 can determine the lateral distance between the receiving vehicle 32 and the harvester 10 (the distance along direction 42) using the distance information in the data. The controller 50 uses the locations of the data patterns, such as patterns 60 and 62, to determine whether the unload conveyor 22 of the harvester 10 is behind, in front of or even with the bin 38 of the receiving vehicle 32 or, in other words, the position of the receiving vehicle 32 relative to the unload conveyor 22 along the direction 40 illustrated in FIG. 2. In FIGS. 2 and 4 the unload conveyor 22 is approximately centered in the field of view of the electromagnetic detecting and ranging module 44. If the harvester 10 were located further to the bottom of the drawing relative to the receiving vehicle 32 the unload conveyor 22 would be toward the back of or behind the bin 38 and if the harvester 10 were further to the top of the drawing the unload conveyor 22 would be toward the front of or in front of the bin 38. Thus, the controller 50 uses patterns of data collected by the electromagnetic detecting and ranging module 44 to determine the lateral (side-to-side) position of the harvester 10 relative to the receiving vehicle 32 (along direction 42) and to determine the longitudinal (front-to-back) position of the harvester 10 relative to the receiving vehicle 32 (along direction 40).

The controller 50 may use an iterative closest point (ICP) algorithm to match the speed of the receiving vehicle 32 with the speed of the harvester 10. Using an ICP algorithm, one set of data points (the reference or target data set) is kept fixed while another set of data points (the source) is transformed to best match the reference data set. The algorithm involves iteratively revising the source data set (through a combination of translation and rotation) needed to minimize an error metric, usually a distance from the source data set to the reference data set, such as the sum of squared differences between the coordinates of the matched pairs. The controller 50 may use an ICP algorithm to match data generate by the electromagnetic detecting and ranging module 44 with a reference data set corresponding to the proper position of the receiving vehicle 32 relative to the harvester 10.

The controller 50 uses the location information to generate control signals for controlling movement of the receiving vehicle 32 to coordinate receiving crop material in the bin 38 from the harvester 10, or for controlling the graphical user interface 56 to present a visual indicator of the relative locations of the receiving vehicle 32 and the agricultural harvester 10.

Figure 5:
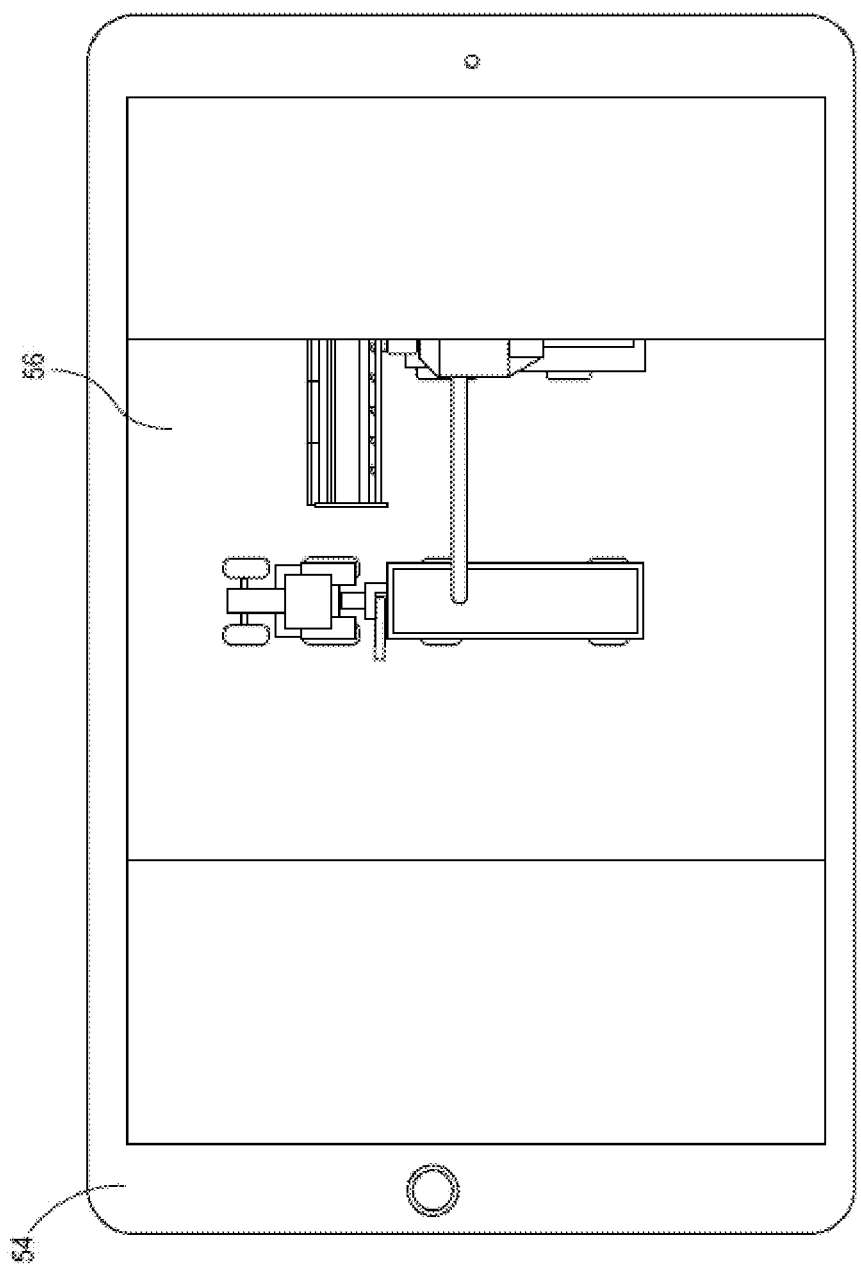
FIG. 5 illustrates a graphical user interface associated with a portable electronic device, the graphical user interface including a graphical depiction of the agricultural crop receiving vehicle and the agricultural harvester.
Figure 6:
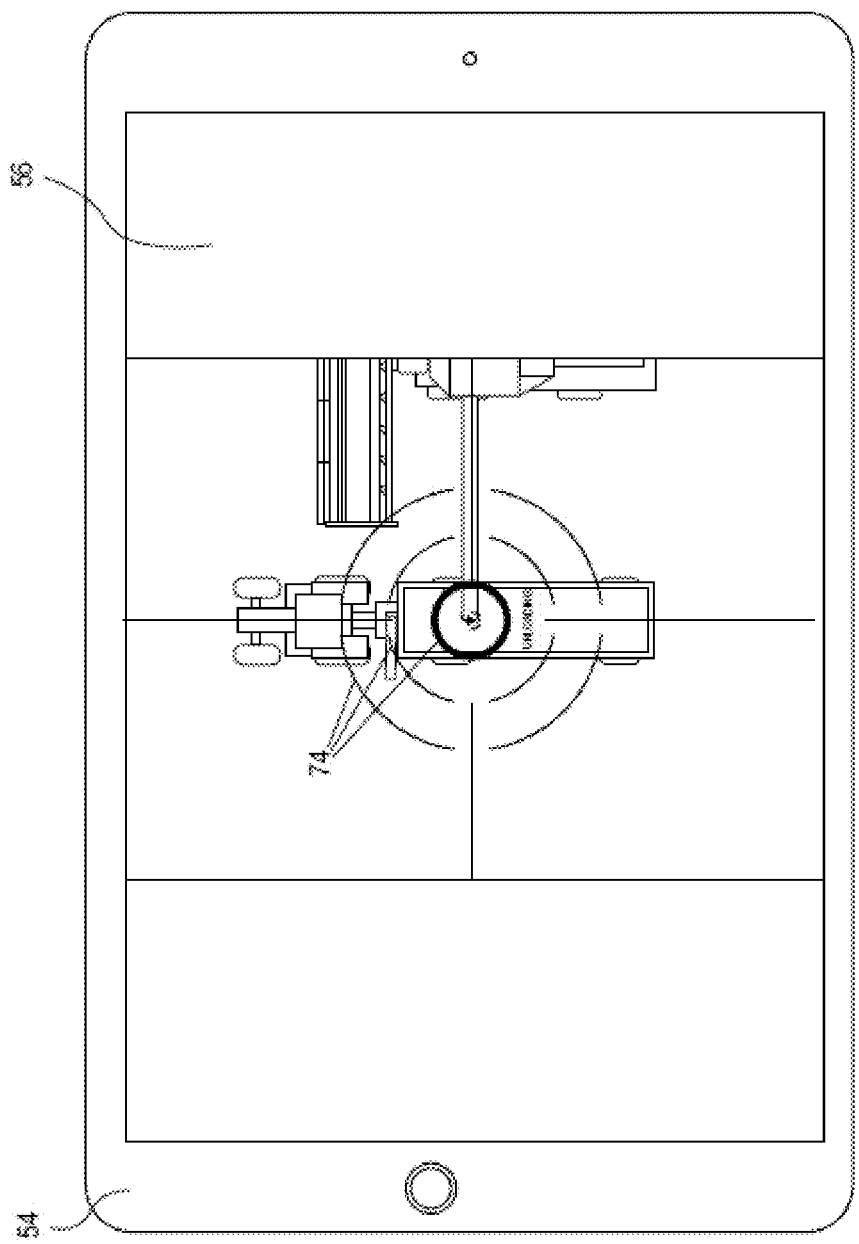
FIG. 6 illustrates a graphical user interface associated with a portable electronic device, the graphical user interface including a graphical representation of the agricultural crop receiving vehicle, the agricultural harvester and concentric target lines indicating a position of a spout of an unload conveyor of the agricultural harvester.

FIGS. 5 and 6 illustrate the controller 50 using the location of the harvester 10 relative to the receiving vehicle 32 to generate a visual indicator in the form of a graphic representation of at least portions of the harvester 10 and the receiving vehicle 32 that illustrate, in an intuitive way, the relative positions of the unload conveyor 22 of the harvester 10 and the bin 38 of the receiving vehicle 32. The graphic representation is presented on the graphical user interface 56 used by an operator of the receiving vehicle 32, by an operator of the harvester 10 or both. When used by the operator of one of the receiving vehicle 32 or the harvester 10, the graphical user interface 56 is typically located toward the front or side of the operator when he or she is facing forward, thereby allowing the operator to see the position of the bin 38 relative to the unload auger 22 and operate the receiving vehicle 32 so that the bin 38 is located beneath the spout of the unload conveyor 22. This relieves the operator of the need to try to look backward to see the position of the unload conveyor while also watching the field ahead of the machine. The use of the visual indicator in this manner has the further advantage of enabling the operator to see the relative positions of the machines even in situations with limited visibility outside the operator cabin.

As depicted in FIG. 3 the portable electronic device 54 is in wireless communication with the controller 50 via the wireless transceiver 52. Thus, the portable electronic device 54 may be located inside the receiving vehicle 32, inside the harvester 10, inside another vehicle or in another location. The graphical representation is presented as part of the graphical user interface 56 on the portable electronic device 54 in FIGS. 5 and 6, wherein both the bin 38 of the receiving vehicle 32 and the conveyor 22 of the harvester 10 are depicted graphically. The graphical representation of the receiving vehicle 32, the harvester 10 and their relative positions enables the operator of the receiving vehicle 32 to guide the receiving vehicle 32 to a location relative to the harvester 10 where the bin 38 is properly aligned with the conveyor 22. The receiving vehicle 32 and the harvester 10 are depicted in plan view (that is, from a perspective directly above the machines and looking down) so that the operator can clearly see from the graphic representation the relative positions of the receiving vehicle 32 and the harvester 10.

FIG. 6 depicts an alternative implementation of the graphical representation similar to that of FIG. 5 wherein the depiction of the receiving vehicle 32 and the harvester 10 includes concentric target lines 74 around the graphical depiction of the spout 24 of the unload conveyor 22 to further assist an operator in aligning the unload conveyor 22 with the grain bin 38.

Alternatively, the controller 50 may use the location information to generate control signals for controlling movement of the receiving vehicle 32 to coordinate receiving crop material in the bin 38 from the harvester 10, also referred to herein as automated guidance.

Generally, automated guidance of a machine involves generating or acquiring a target travel path known as a wayline, determining a geographic location of the machine, comparing the machine's geographic location to the location of the wayline and automatically steering the machine to travel along the wayline. The wayline may be generated by an operator of the machine by, for example, designating a starting point and an ending point of the wayline or designing a start point and a direction of travel. The wayline may also be stored and retrieved from a previous operation, received from another agricultural machine or imported from an external computer device, such as an external computer running farm management software that generates the wayline. The wayline is represented by two or more geographic locations or points known as waypoints. The automated guidance system is part of the machine and is included in the electronic system described above. Automated guidance software stored in a data storage component, for example, enables the controller 50 to determine or acquire the wayline, determine the machine's location using the position determining component, compare the machine's location with the location of the wayline, and automatically steer the machine using data from the one or more sensors to determine a steering angle of the wheels and using the actuators to change the steering angle of the wheels, if necessary, to steer the machine to or along the wayline.

During operation the machine's geographic location is continuously determined using a GNSS receiver, and the location of a navigation point of the machine (for example, a point located between the rear wheels of a tractor or between the front wheels of a harvester) is continuously compared with the location of the wayline. Steering of the machine is automatically controlled so that the navigation point of the machine follows the wayline.

The automated guidance system of the receiving vehicle 32 automatically aligns the grain bin 38 with the unload conveyor 22 by generating a wayline that corresponds to a path that will place the grain bin 38 beneath the spout 24 of the unload conveyor 22. By way of example, the controller 50 may determine from the camera data that the lateral distance of the grain cart 36 from the harvester 10 is seven meters. If the lateral distance required to align the grain bin 38 with the spout 24 is six meters, the automated guidance system of the receiving vehicle 32 generates a wayline that is one meter closer to the harvester 10 than the receiving vehicle's present location and steers the receiving vehicle 32 to follow the wayline. Similarly, if the controller 50 determines that the lateral distance is four meters, the automated guidance system of the receiving vehicle 32 generates a wayline that is two meters further away from the harvester 10 than the receiving vehicle's present location and steers the receiving vehicle 32 to follow the wayline.

The automated guidance system further controls the propulsion of the receiving vehicle 32 to shift the vehicle's position forward or rearward relative to the harvester 10 to maintain a proper longitudinal position of the receiving vehicle 32 relative to the harvester 10 such that the receiving vehicle 32 presents a proper front to back position relative to the unload conveyor 22. If the controller 50 determines that the receiving vehicle 32 has a negative longitudinal offset relative to the harvester 10 (in other words, the position of the receiving vehicle 32 is behind a desire position relative to the harvester 10) the automated guidance system causes the receiving vehicle 32 to speed up until it is at the desire position, then causes it to match the speed of the harvester 10. Similarly, if the controller 50 determines that the receiving vehicle 32 has a positive longitudinal offset relative to the harvester 10 (in other words, the position of the receiving vehicle 32 is ahead of a desire position relative to the harvester 10) the automated guidance system causes the receiving vehicle 32 to slow down until it is at the desire position, then causes it to match the speed of the harvester 10.

Figure 7:
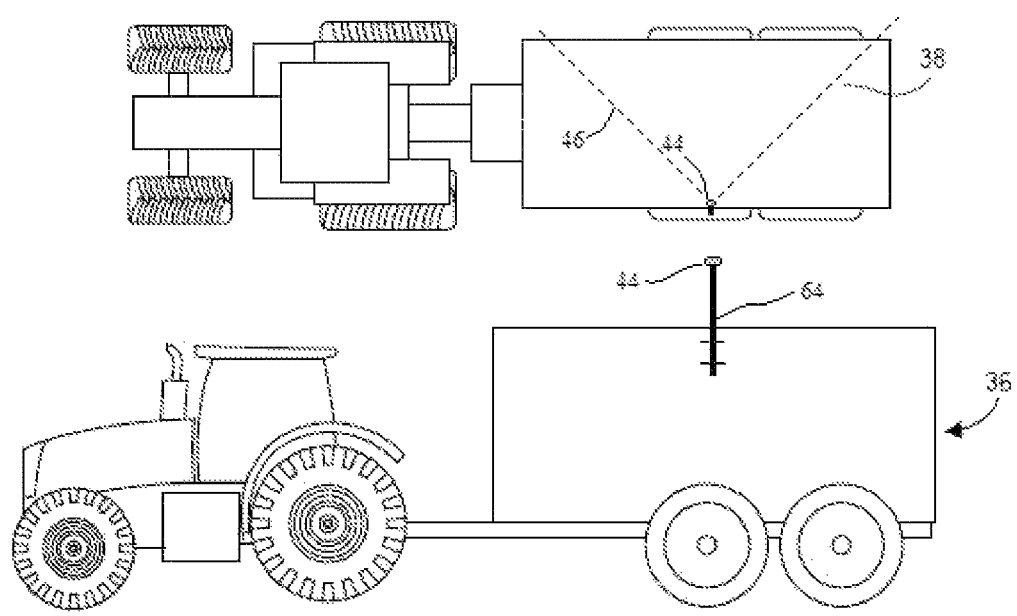
FIG. 7 illustrates the electromagnetic detecting and ranging module at a different position on the agricultural crop receiving vehicle.

Another embodiment of the invention is illustrated in FIG. 7. The embodiment illustrated in FIG. 7 is identical to the embodiment described above in relation to FIGS. 1-6 except that in the embodiment illustrated in FIG. 7 the electromagnetic detecting and ranging module 44 is mounted above the bin 38 and on a side of the receiving vehicle 32 opposite the harvester 10 during crop transfer operations. This position of the electromagnetic detecting and ranging module 44 allows the field of view 46 to include both the harvester 10 and an inside of the bin 38 of the receiving vehicle 32. Using this configuration, the electromagnetic detecting and ranging module 44 collects data indicating the position of the harvester 10 relative to the receiving vehicle 32 as well as data indicating a fill level and/or a distribution pattern of crop material in the bin 38.

The illustrated embodiment includes a pedestal 64 on the cart 36 that holds the electromagnetic detecting and ranging module 44 above the bin 38. The electromagnetic detecting and ranging module 44 is or includes a three-dimensional LiDAR positioned so that the field of view includes both an area proximate the receiving vehicle 32 that includes the harvester 10 during crop transfer operations as well as an inside of the bin 38, as explained above. In this position the electromagnetic detecting and ranging module 44 can collect data points corresponding to the harvester 10, such as the data points illustrated in FIG. 4 and including patterns 60 and 62, as well as data points corresponding to an inside of the bin 38, as illustrated in FIGS. 8 and 9.

Figure 8:
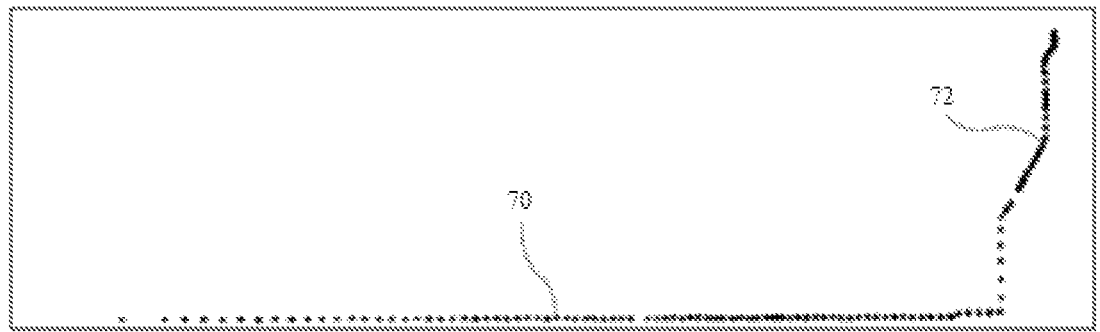
FIG. 8 illustrates data points collected by the electromagnetic detecting and ranging module on the receiving vehicle of FIG. 7, the data points collected when the bin of the receiving vehicle is empty.
Figure 9:
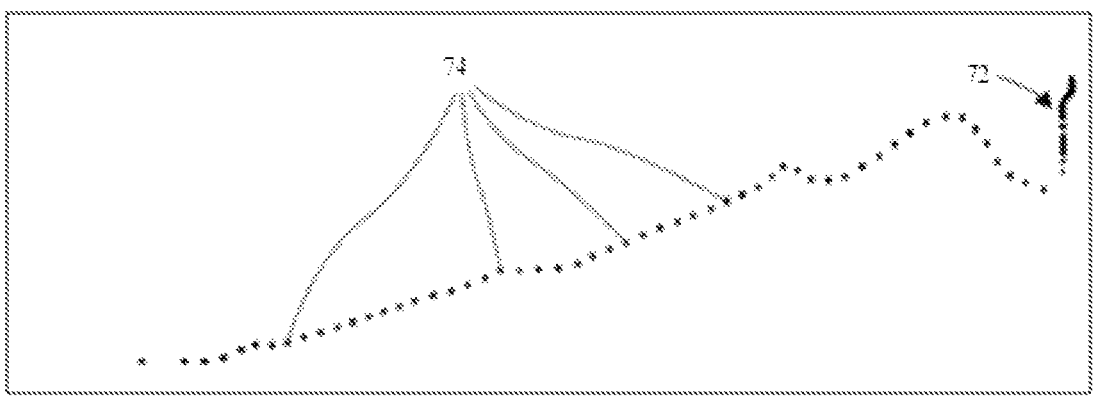
FIG. 9 illustrates data points collected by the electromagnetic detecting and ranging module on the receiving vehicle of FIG. 7, the data points collected when the bin of the receiving vehicle is partially filled.

A series of data points generated by the module 44 when the bin 38 of the receiving vehicle 32 is empty is illustrated in FIG. 8. A first pattern 70 corresponds to an interior surface of a floor of the bin 38 and a second pattern 72 corresponds to an interior surface of a rear wall of the bin 38. A series of data points generated by the module 44 when the bin 38 is partially filled is illustrated in FIG. 9. In FIG. 9 the generally vertical pattern 72 corresponds to the rear wall of the bin 38 while the data points 74 corresponding to the generally diagonal angled and curved patterns in the middle correspond to a top surface of a quantity of grain or other crop material heaped in the bin 38.

The controller 50 uses the data generated by the electromagnetic detecting and ranging module 44 to determine the fill level of the receiving vehicle 32, the distribution of grain (or other processed crop material) within the receiving vehicle 32, or both. To determine the fill level of the receiving vehicle 32 the controller 50 identifies data points 74 corresponding to crop material (verses data points corresponding to walls or the floor of the grain bin), determines a fill height of each of the data points corresponding to crop material, and then averages the fill height of the data points corresponding to crop material to generate an average fill level of the bin 38. The fill height of the various data points corresponds to the distribution of crop material in the bin 38.

To identify data points corresponding to crop material the controller 50 uses patterns in the data. The controller 50 uses patterns in the data by identifying patterns corresponding to certain parts of the bin 38 such as a rear wall (for example, pattern 72) and floor (for example, pattern 70) or a combination thereof. In the collection of data illustrated in FIG. 8, for example, the rear wall and floor are identified from the data patterns 70 and 72 it is determined that none of the data points correspond to crop material. In the collection of data illustrated in FIG. 9, the rear wall is identified from the data pattern 72. When the data patterns detected in FIG. 9 are compared to a data pattern corresponding to an empty bin (FIG. 8) it is determined that most of the data points other than those corresponding to the rear wall do not match the expected location and shape of a data pattern corresponding to the floor and, therefore, correspond to crop material. The controller 50 then determines a fill height of each of the data points 74 corresponding to crop material, wherein the fill height is the distance of the data point from the floor of the bin 38 to the data point. The fill height is determined, for example, by comparing the location of the data point to the anticipated location of the floor. In the illustrated data patterns, this may involve comparing the data points 74 to data points 70. Once the fill height is determined for all of the data points an average fill height of all of the data points is determined and used as the overall bin 38 fill level, as stated above.

The controller 50 uses the location information and the bin fill information from the electromagnetic detecting and ranging module 44 for controlling movement of the agricultural crop receiving vehicle 32 to coordinate receiving crop material in the bin 38 from the harvester 10 according to a predetermined fill level or distribution pattern of the crop in the bin 38, or for controlling the graphical user interface 56 to present a visual indicator of the relative locations of the agricultural crop receiving vehicle 32 and of a fill level or a distribution of crop in the bin 38.

Figure 10:
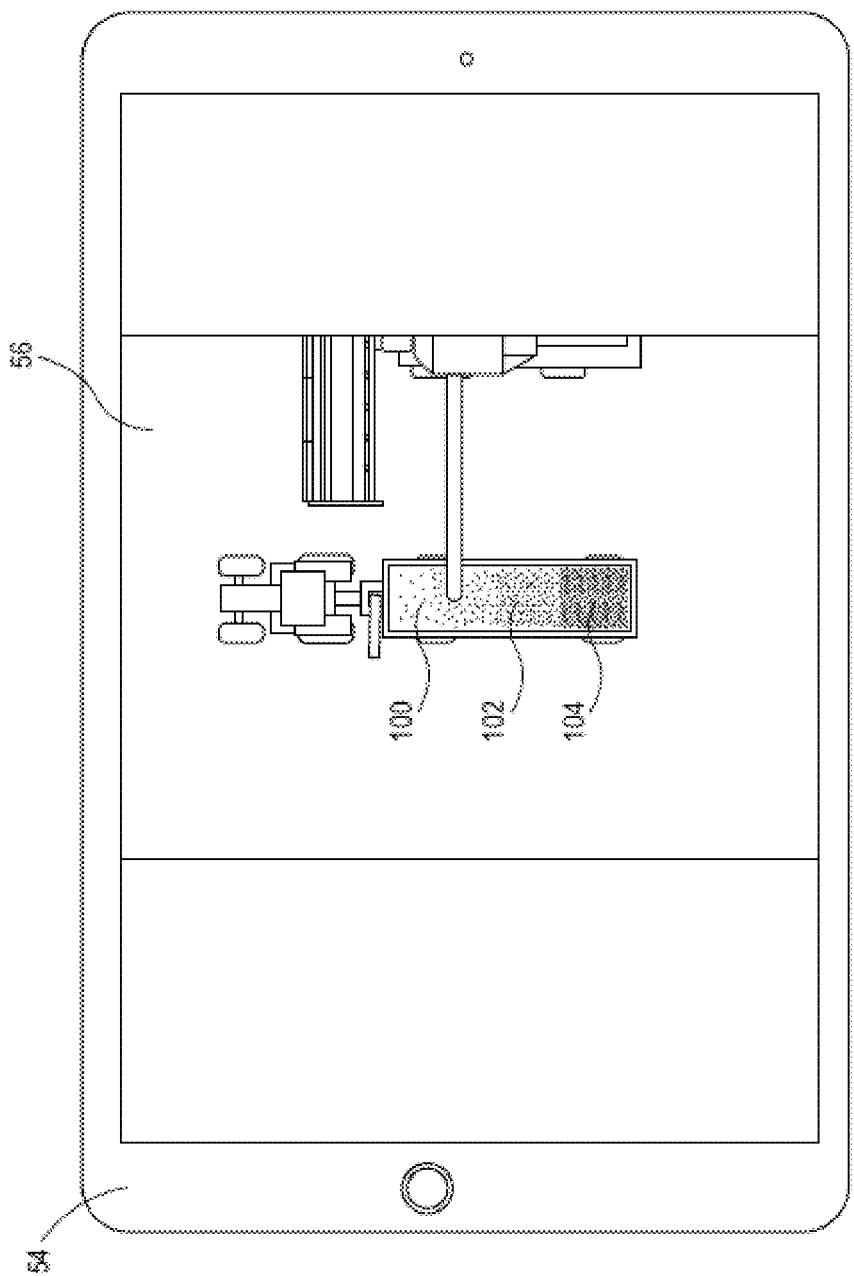
FIG. 10 illustrates a graphical user interface associated with a portable electronic device, the graphical user interface including a graphical depiction of the agricultural crop receiving vehicle and the agricultural harvester, and showing a fill level and distribution of crop within the bin of the agricultural crop receiving vehicle.

FIG. 10 illustrates the graphical user interface 56 presenting a visual indicator of the relative locations of the agricultural crop receiving vehicle 32 and of a fill level or a distribution of crop in the bin 38. The graphical depiction of the user interface of FIG. 10 is the same as that of FIG. 5, described above, except that the graphical depiction illustrated in FIG. 10 includes an indicator of the fill level and distribution of crop in the bin 38. In particular, a forward area 100 of the cart 36 is visually depicted as having a low fill level with a light fill pattern, a middle area 102 of the cart 36 is depicted as having a medium fill level with a semi-dark fill pattern, and a rear area 104 of the cart 36 is depicted as having a high fill level with a dark fill pattern. Using this user interface a machine operator could quickly and easily see the relative locations of the bin 38 and the unload conveyor 22 and the distribution of crop material in the bin 38. In the illustrated example the operator can see that the fill level of the bin 38 is high toward the rear and low toward the front and maneuver the receiving vehicle 32 to fill the front of the bin 38.

The crop fill information from the data collected by the module 44 may also be used by the controller 50 to automatically guide the receiving vehicle 32 relative to the harvester 10 to fill the bin 38 with crop material according to a desired fill pattern. Using data patterns corresponding to the harvester 10 the controller 50 can determine the position of the harvester 10 relative to the receiving vehicle 32, as explained above. Using that information and the fill information from data patterns corresponding to the bin 38 the controller 50 may identify a portion of the bin 38 with a lower fill level, such as area 100 in FIG. 10, and automatically adjust the position of the receiving vehicle 32 relative to the harvester 10 by, for example, increasing or decreasing the speed of the receiving vehicle 32.

Figure 11:
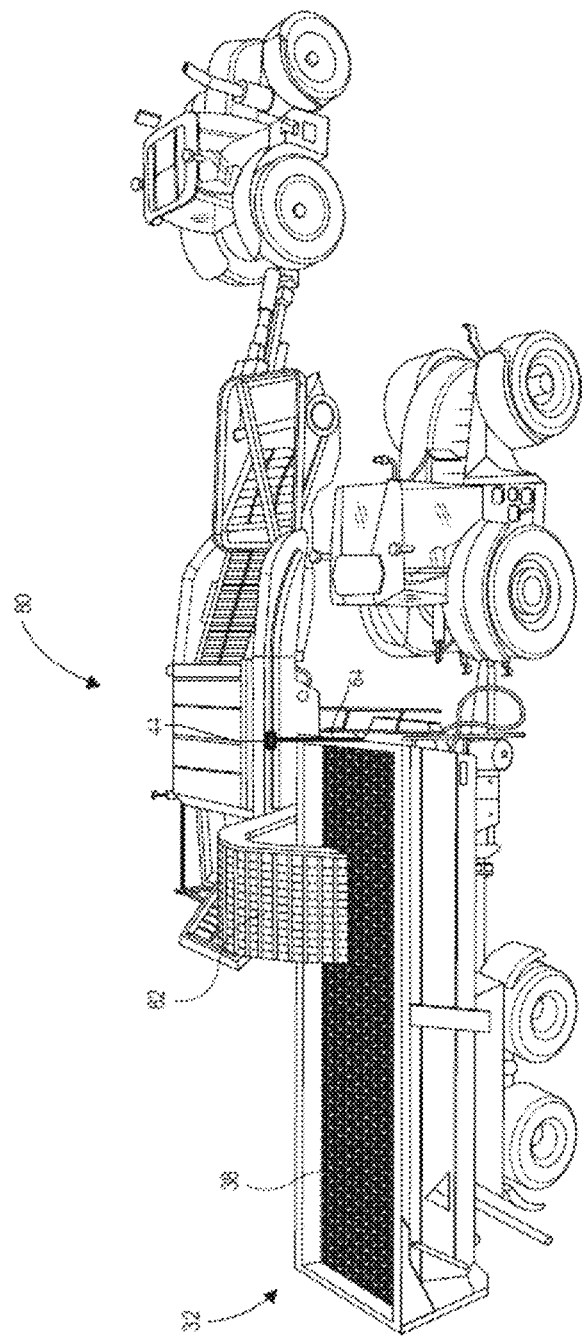
FIG. 11 depicts a vegetable harvester and agricultural crop receiving vehicle constructed according to an embodiment of the invention.
Figure 12:
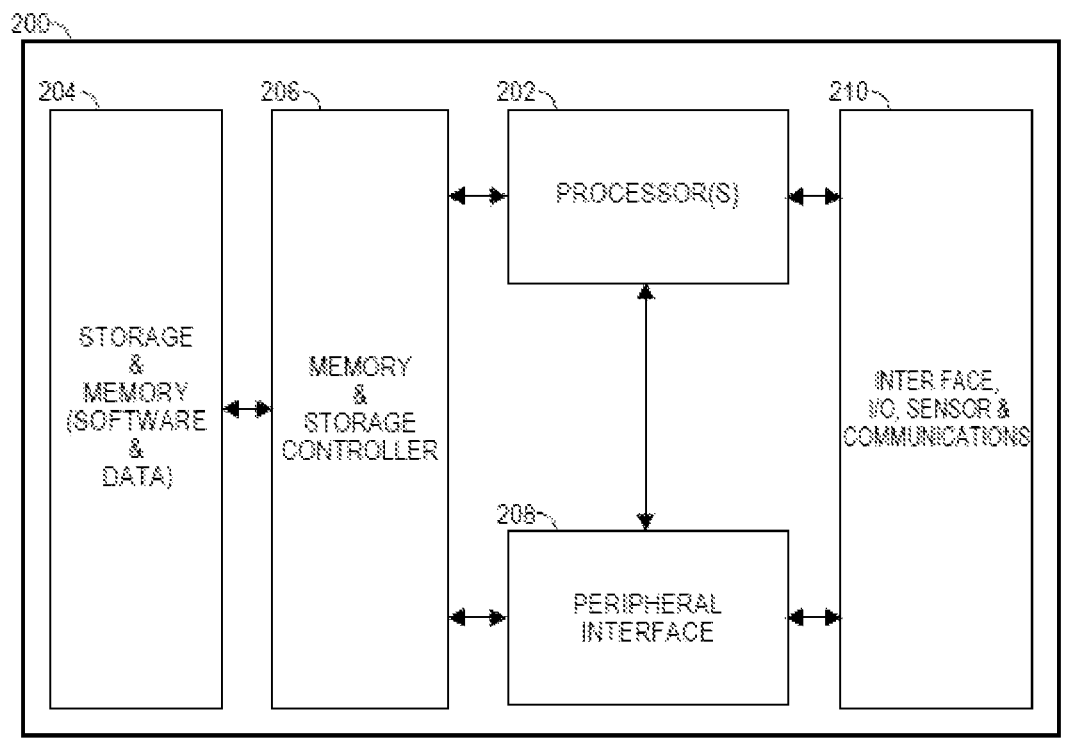
FIG. 12 is a block diagram of certain components of a portable electronic device.

In the implementation described and illustrated above the harvester 10 is a combine harvester. The invention is not so limited, however, and contemplates the use of other harvesters. FIG. 11 illustrates an implementation of the present invention that includes a vegetable harvester 80, such as a potato harvester, pulled by a tractor. The vegetable harvester 80 includes a conveyor 82 for transferring the harvested vegetables to the bin 38 of the receiving vehicle 32. The pedestal 64 is positioned at a front of the bin 38 and holds the electromagnetic detecting and ranging module 44 in a position above the bin 38 such that a field of view of the module 44 includes an inside of the bin 38 and an area proximate the receiving vehicle 32 that includes the harvester 80 during a crop transfer operation. In this implementation the controller 50 determines a location of the harvester 80 relative to the receiving vehicle 32 and a fill level or distribution pattern of crop material in the bin 38 using data collected from the module 44 as explained above. Using the location of the harvester 80 and the fill level or distribution pattern, the controller 50 generates control signals for controlling movement of the receiving vehicle 32 to coordinate receiving crop material in the bin 38 from the harvester 80, or for controlling the graphical user interface 56 to present a visual indicator of the relative locations of the receiving vehicle 32 and the agricultural harvester 10.

A schematic diagram of certain components of a portable electronic device 200 is illustrated in FIG. 16 and includes one or more computer processors 202, one or more memory and storage components 204, memory and storage controller circuitry 206, peripheral interface circuitry 208 and other hardware/circuitry 210 associated with user interface(s) (for example, a graphical user interface), input/output, sensors and communications (for example, wireless or wired network communications). The memory and storage component 204 stores computer software executable by the processor(s) 202, such as an operating system and applications, as well as data. The memory and storage controller 206 controls access to and communication with the memory 204 by the processor(s) 202 and the peripheral interface 208. When a software application is installed or run on the portable electronic device 200 the executable computer instructions, as well as the data, associated with the app are stored in the storage and memory components and executed by the processor(s). The processor(s) 202, the peripheral interface 208 and/or the hardware and circuitry 210 associated with the interface, I/O, sensors and communications enable a human-machine interface such as a touchscreen through which a user interacts with the device. The processor(s) 202, the peripheral interface 208 and/or the hardware and circuitry 210 associated with the interface, I/O, sensors and communications also enable communications with an external communications or computer network or with an external machine, such as the harvester 10.

Although the invention has been described with reference to the preferred embodiment illustrated in the attached drawing figures, it is noted that equivalents may be employed and substitutions made herein without departing from the scope of the invention as recited in the claims.

The claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

1. A system comprising:
   an agricultural crop receiving vehicle comprising:
   a bin for receiving and holding agricultural crop material, and
   an electromagnetic detecting and ranging module for generating data indicating the presence and location of a harvester; and
   a controller comprising:
   at least one processor; and
   at least one non-transitory computer-readable storage medium storing instructions thereon that, when executed by the at least one processor, cause the controller to:
   receive the data from the electromagnetic detecting and ranging module;
   based at least partially on the received data, identify at least one pattern of data points corresponding to a surface or an edge of the harvester;
   based on the identified at least one pattern, identify at least one of a header or a body of the harvester;
   determine a location of at least one of the header or the body of the harvester using locations of the data points of the identified at least one pattern;
   based the determined location of the at least one of the header or the body of the harvester, determine a location of the harvester relative to the agricultural crop receiving vehicle; and
   based at least partially on the determined location of the harvester relative to the agricultural crop receiving vehicle, control one or more operations of the agricultural crop receiving vehicle to adjust or maintain a position of the agricultural crop receiving vehicle relative to the harvester.

2. The system of claim 1, wherein the data generated by the electromagnetic detecting and ranging module comprises an indication of a lateral distance between the harvester and the agricultural crop receiving vehicle and a longitudinal position of the harvester relative to the agricultural crop receiving vehicle.

3. The system of claim 1, wherein the controller further comprises instructions that, when executed by the at least one processor, cause the controller to cause the electromagnetic detecting and ranging module to perform a two-dimensional scan.

4. The system of claim 1, wherein the controller further comprises instructions that, when executed by the at least one processor, cause the controller to cause the electromagnetic detecting and ranging module to perform a three-dimensional scan.

5. The system of claim 1, wherein the electromagnetic detecting and ranging module comprises a light detecting and ranging (LiDAR) module.

6. The system of claim 1, wherein the electromagnetic detecting and ranging module comprises a radio detecting and ranging (RADAR) module.

7. The system of claim 1,
wherein the received data further comprises an indication of a fill level or distribution of a crop material in the bin of the agricultural crop receiving vehicle, and
wherein controlling one or more operations of the agricultural crop receiving vehicle to adjust or maintain a position of the agricultural crop receiving vehicle relative to the harvester is based at least partially on the indication of the fill level or the distribution pattern of the crop material in the bin of the agricultural crop receiving vehicle.

8. The system of claim 7, wherein the electromagnetic detecting and ranging module is positioned above the bin of the agricultural crop receiving vehicle, and wherein a field of view of the electromagnetic detecting and ranging module includes an inside of the bin and an area outside the bin.

9. A method comprising:
receiving, via a controller, data generated by an electromagnetic detecting and ranging module, the electromagnetic detecting and ranging module being on an agricultural crop receiving vehicle and the data indicating the presence and location of a harvester;
based at least partially on the received data, identifying at least one pattern of data points corresponding to a surface or an edge of the harvester;
based on the identified at least one pattern, identify at least one of a header or a body of the harvester;
determine a location of at least one of the header or the body of the harvester using locations of the data points of the identified at least one pattern;
based the determined location of the at least one of the header or the body of the harvester, determine a location of the harvester relative to the agricultural crop receiving vehicle; and
based at least partially on the determined location of the harvester relative to the agricultural crop receiving vehicle, control one or more operations of the agricultural crop receiving vehicle to adjust or maintain a position of the agricultural crop receiving vehicle relative to the harvester.

10. The method of claim 9, wherein the data generated by the electromagnetic detecting and ranging module comprises an indication of a lateral distance between the harvester and the agricultural crop receiving vehicle and a longitudinal position of the harvester relative to the agricultural crop receiving vehicle.

11. The method of claim 9, further comprising causing the electromagnetic detecting and ranging module to perform a two-dimensional scan.

12. The method of claim 9, further comprising causing the electromagnetic detecting and ranging module to perform a three-dimensional scan.

13. The method of claim 9, wherein the electromagnetic detecting and ranging module comprises a light detecting and ranging (LiDAR) module.

14. The method of claim 9, wherein the electromagnetic detecting and ranging module comprises a radio detecting and ranging (RADAR) module.

15. The method of claim 9,
wherein the received data further comprises an indication of a fill level or distribution of a crop material in a bin of the agricultural crop receiving vehicle, and
wherein controlling one or more operations of the agricultural crop receiving vehicle to adjust or maintain a position of the agricultural crop receiving vehicle relative to the harvester is based at least partially on the indication of the fill level or the distribution pattern of the crop material in the bin of the agricultural crop receiving vehicle.

16. The method of claim 15, wherein the electromagnetic detecting and ranging module is positioned above the bin of the agricultural crop receiving vehicle, and wherein a field of view of the electromagnetic detecting and ranging module includes an inside of the bin and an area outside the bin.

17. The system of claim 1, wherein the controller further comprises instructions that, when executed by the at least one processor, cause the controller to cause a graphical user interface to present a visual indicator of the determined location of the harvester relative to the agricultural crop receiving vehicle.

18. The method of claim 9, further comprising causing a graphical user interface to present a visual indicator of the determined location of the harvester relative to the agricultural crop receiving vehicle.

* * * * *